(No Model.)  W. R. PATTERSON.  3 Sheets—Sheet 2.
HYDROSTATIC TESTING MACHINE FOR TELEGRAPH CABLES.
No. 324,412.  Patented Aug. 18, 1885.
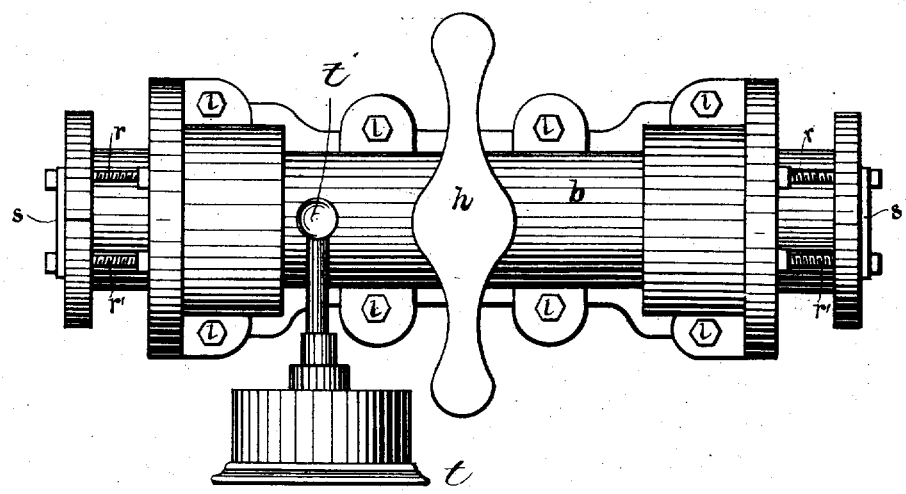

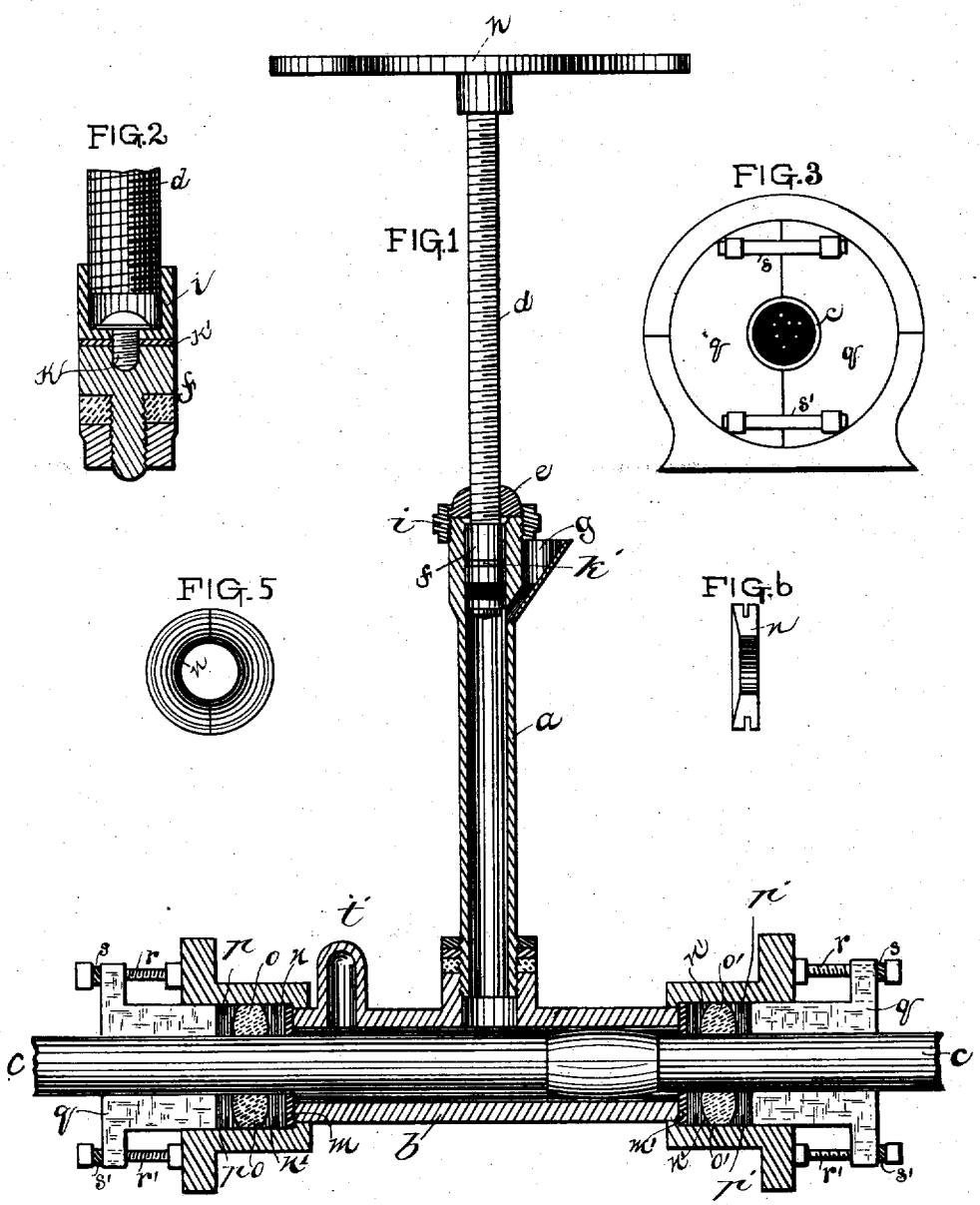

(No Model.)  
3 Sheets—Sheet 3.

W. R. PATTERSON.

HYDROSTATIC TESTING MACHINE FOR TELEGRAPH CABLES.

No. 324,412.  
Patented Aug. 18, 1885.

Witnesses.  
Henry Frankfurter.  
Hiram Odell.

Inventor.  
William R. Patterson.  
By George Barton,  
Attorney.

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

HYDROSTATIC TESTING-MACHINE FOR TELEGRAPH-CABLES.

SPECIFICATION forming part of Letters Patent No. 324,412, dated August 18, 1885.

Application filed March 22, 1884. (No model.)

*To all whom it may concern:*

Be it known that I, WILLIAM R. PATTERSON, a citizen of the United States, residing at Chicago, in the county of Cook and State of Illinois, have invented a certain new and useful Improvement in Hydrostatic Presses, of which the following is a full, clear, concise, and exact description, reference being had to the accompanying drawings, forming a part of this specification.

My invention relates to hydrostatic presses, and is designed especially for testing the joints of the lead pipe of telegraph-cables. In making tests of this kind it is necessary to press the water about the joint with great force. This I am enabled to do by the use of my hydrostatic press, as hereinafter described. My hydrostatic press, though designed especially for testing cables, may be used wherever great pressure is required at any portion of the outside.

Figure 7:
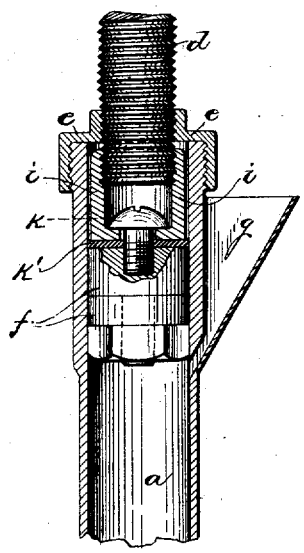
Figure 8:
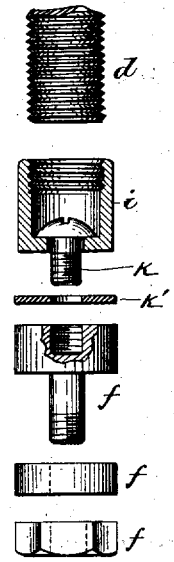

In the drawings, which are illustrative of my invention, Figure 1 is a vertical longitudinal sectional view of a hydrostatic press embodying my improvements. Fig. 2 is a detailed view, partly in section, of the piston. Fig. 3 is an end elevation of the hydrostatic press shown in Fig. 1. Fig. 4 is a plan view. Figs. 5 and 6 are detailed views of one of the beveled rings forming part of the packing-box. Figs. 7 and 8 are detailed views illustrative of the swivel connecting the piston with the piston-rod.

Like parts are indicated by the same letters of reference in the different figures.

The barrel $a$ is attached to the cylinder $b$, which is designed to surround the joint of the pipe $c$. The piston-rod $d$ is provided with a thread which turns in the nut $e$, thus forcing the piston $f$ up and down in the barrel $a$ as the rod is turned. The opening $g$ is provided in the barrel for filling the same with water. After the barrel is filled the piston may be screwed down by means of the handle $h$. As shown in Figs 7 and 8, it will be seen that the piston-rod is connected to the piston by a swivel. The end of the piston-rod is securely attached to the thimble $i$, which is provided with an opening in the center for the screw $k$. This screw $k$ is provided with a head, which rests upon the thimble under the end of the rod, as shown. The screw $k$ is attached rigidly to the piston. The washer $k'$ is placed over the piston below this thimble, as shown. The piston-rod may thus be screwed up and down in the nut $e$ without turning the piston, since the thimble turns freely about the screw $k$.

I will now describe the the cylinder $b$, which is so constructed that it may be placed about a joint of cable and packed tight after the cable is completed.

As shown in the drawings, the two halves of the cylinder are held together by bolts $l$, the space about the pipe at the ends of the cylinder being filled with packing, secured as shown in Fig. 1. The washers $m$ $m'$ are preferably of leather. Next to the leather rings I place the metallic rings $n$ $n'$. These rings are preferably concave or beveled on their outer sides. The rubber rings $o$ $o'$, which should fit closely about the pipes are now slipped into the ends of the cylinder, and the rings $p$ $p'$, which may be symmetrical with rings $n$ $n'$, are then forced against the rubber rings. By means of the glands $q$ $q$ sufficient pressure may be brought to bear upon the rubber rings to make the joints capable of resisting the internal pressure. These glands are each in sections, and, as shown in the drawings, are forced down against the packing by means of screws $r$ $r'$. The cross-pieces $s$ $s'$ serve to connect the sections of each of the glands together, so that both sections of a gland may be forced down at the same time and press uniformly upon the packing.

The core of conductors may be drawn into the sections of pipe, as shown in my Patent No. 294,500, of March 4, 1884, and after the joints are wiped the paraffine charged with gas may be forced in by the apparatus shown in my Patent No. 284,226, of September 4, 1883. The paraffine being forced into the pipe hot will be under sufficient pressure to test the joints of the pipe. If a defective joint is found, it must be rewiped after the paraffine has cooled.

In laying cables it is necessary to make splices, and the joints of the lead pipe must be wiped and tested. My hydrostatic press is designed especially for testing joints which have been found defective during the process of filling and rewiped and joints which are made in laying the cables. In the latter case I preferably leave the leather washers and rubber rings whole, slipping them over the ends of the sections of cable before the splice is made. Having tested a joint, the washers and rubber rings are cut and may be thrown away. In the former case it is evident that the washers and other parts of the packing must be in sections.

My hydrostatic press, as thus constructed, may be used for testing the joints of telegraph-cables. The joint to be tested is placed within the cylinder, as shown in Fig. 1. By pressing the water about the joint, and at the same time observing a galvanometer in a battery-circuit with the different wires of the cable, it may be readily seen whether moisture penetrates the joint.

I claim—

1. In a hydrostatic press, the combination, with the barrel, of the screw-threaded piston-rod, the nut and the piston connected to said rod by a swivel-joint, whereby the piston may be forced down without being turned by the piston-rod, substantially as shown and described.

2. In a hydrostatic press, the combination, substantially as hereinbefore set forth, of the barrel and piston, said barrel being provided with an opening, as described, whereby water may be turned into the barrel directly under the piston when raised, substantially as and for the purpose specified.

3. The combination, with the vertical barrel of a hydrostatic press, of the sectional cylinder placed horizontally and provided with packing-boxes at each end, substantially as and for the purpose specified.

4. The combination, with a hydrostatic press provided with the piston attached to the piston-rod, as described, of the vertical barrel, the cylinder composed of sections, unbroken rubber rings, and sectional metallic rings and glands, as described, whereby the press may be placed about a joint of pipe, substantially as and for the purpose specified.

5. In a packing-box, a continuous rubber ring, in combination with concave sectional metallic rings and a sectional gland and means for pressing said gland against the outer concave ring and thereby making a tight joint, substantially as and for the purpose specified.

In witness whereof I hereunto subscribe my name this 18th day of March, A. D. 1884.

WILLIAM R. PATTERSON.

Witnesses:
GEORGE P. BARTON,
C. C. SHEPHERD.